United States Patent
Shen

(10) Patent No.: US 12,082,543 B2
(45) Date of Patent: Sep. 10, 2024

(54) FILTER-HANGING PLANTING STRUCTURE

(71) Applicant: Yu-Jyun Shen, Taipei (TW)

(72) Inventor: Yu-Jyun Shen, Taipei (TW)

(*) Notice: Subject to any disclaimer, the term of this patent is extended or adjusted under 35 U.S.C. 154(b) by 202 days.

(21) Appl. No.: 17/409,902

(22) Filed: Aug. 24, 2021

(65) Prior Publication Data
US 2022/0167563 A1    Jun. 2, 2022

(30) Foreign Application Priority Data
Nov. 27, 2020    (TW) .................. 109215654

(51) Int. Cl.
*A01G 9/029*    (2018.01)
*A01G 18/66*    (2018.01)
*B01D 29/35*    (2006.01)

(52) U.S. Cl.
CPC ........... *A01G 9/0293* (2018.02); *B01D 29/35* (2013.01)

(58) Field of Classification Search
CPC . A01G 9/00; A01G 9/02; A01G 9/024; A01G 31/00; A01G 31/02; A01G 9/022; A01G 24/50; A01G 7/044; A01G 31/06; A01G 18/66
See application file for complete search history.

(56) References Cited

U.S. PATENT DOCUMENTS

| | | | |
|---|---|---|---|
| 4,149,339 A * | 4/1979 | Hall | A01G 9/024 383/106 |
| 5,201,141 A * | 4/1993 | Ahm | A01G 31/02 47/59 R |
| 5,381,625 A * | 1/1995 | Wente | A01G 9/022 47/82 |
| 8,234,814 B2 * | 8/2012 | Kertz | A01G 31/02 47/79 |
| 2003/0079401 A1 * | 5/2003 | Whitcomb | A01G 9/02 47/32.7 |
| 2005/0166451 A1 * | 8/2005 | Stachnik | A01G 9/025 47/65.7 |
| 2006/0230676 A1 * | 10/2006 | Rowe | A01G 9/02 119/74 |
| 2012/0005958 A1 * | 1/2012 | Laitsch | A01G 31/02 47/62 R |
| 2014/0259920 A1 * | 9/2014 | Wilson | A01G 7/045 47/62 R |
| 2015/0296724 A1 * | 10/2015 | Martinez Ruanova | A01G 9/1407 47/62 R |
| 2019/0045731 A1 * | 2/2019 | Dixon | A01G 31/02 |
| 2019/0069497 A1 * | 3/2019 | Broutin Farah | A01G 9/006 |
| 2019/0261583 A1 * | 8/2019 | DeFoor | B32B 5/06 |

* cited by examiner

*Primary Examiner* — Kristen C Hayes
(74) *Attorney, Agent, or Firm* — Chun-Ming Shih; LANWAY IPR SERVICES

(57) ABSTRACT

A planting structure includes a water filtering bag, a plurality of hanging ears mounted on an outer face of the water filtering bag, and a plurality of planting sources placed in the water filtering bag. The water filtering bag is made of permeable material with a permeation effect. The water filtering bag has an interior provided with a receiving space. The planting sources are received in the receiving space of the water filtering bag. Thus, the planting structure is directly hung on a cup by the hanging ears, so that the user plants and takes out the planting sources at any time according to the practical requirement.

10 Claims, 4 Drawing Sheets

FILTER-HANGING PLANTING STRUCTURE

BACKGROUND OF THE INVENTION

1. Field of the Invention

The present invention relates to a planter and, more particularly, to a filter-hanging planting structure.

2. Description of the Related Art

According to records of the "Herbal Foundation Compendium", an ancient Chinese treatise of medical herbs, the wheatgrass was found to have curative effects, including reducing inflammation and fever, invigorating the stomach, and soothing the intestines. In the modern life, wheatgrass is also made into wheatgrass juice for drinking by many people. The wheatgrass has become a popular healthy food in recent years. Because the wheatgrass is rich in chlorophyll, it is considered to have the effect of improving health and vitality. In addition to the common fruit juice form of the wheatgrass, there are also dried and ground capsules or powders for selection. Because wheatgrass is the new tender leaves of wheat plants (or *Triticum aestivum*), it is rich in vitamins, minerals, enzymes, amino acids, bioflavonoids, polysaccharides and a large amount of chlorophyll (70%). Relevant medical report points out that wheatgrass has the effects of anti-tumor, anti-apoptosis, anti-proliferation, and anti-oxidant. It may be positively helpful to various degenerative diseases, including cancer, rheumatoid arthritis, ulcers, and thalassemia. In view of the various positive effects of wheatgrass, many people grow the wheatgrass by themselves. The potted containers are used to grow the wheatgrass. However, the conventional potted containers occupy much space and are limited by the housing environment. In addition, the conventional potted containers have to use the soil, thereby complicating the planting process.

BRIEF SUMMARY OF THE INVENTION

The primary objective of the present invention is to provide a filter-hanging planting structure that is suspended on any container to provide a planting function.

In accordance with the present invention, there is provided a planting structure comprising a water filtering bag, a plurality of hanging ears mounted on an outer face of the water filtering bag, and a plurality of planting sources placed in the water filtering bag. The water filtering bag is made of permeable material with a permeation effect. The water filtering bag has an interior provided with a receiving space. The planting sources are received in the receiving space of the water filtering bag.

Preferably, the water filtering bag is made of hydrophilic cotton or recycled hydrophilic material.

Preferably, the water filtering bag has a surface provided with a plurality of through holes, and each of the through holes of the water filtering bag has a diameter smaller than that of each of the planting sources.

Preferably, the receiving space of the water filtering bag has an opening provided with a sealing portion. The sealing portion of the water filtering bag is formed with a breakable part having an annular shape. The breakable part of the sealing portion is arranged on the surface of the water filtering bag.

Preferably, each of the hanging ears is attached to the water filtering bag.

Preferably, each of the planting sources is a wheatgrass.

According to the primary advantage of the present invention, the planting structure is directly hung on the cup by the hanging ears, the water is directly poured onto the planting sources in the water filtering bag, and the excessive water is drained outward from the water filtering bag and received by the cup, so that the user plants and takes out the planting sources at any time according to the practical requirement.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
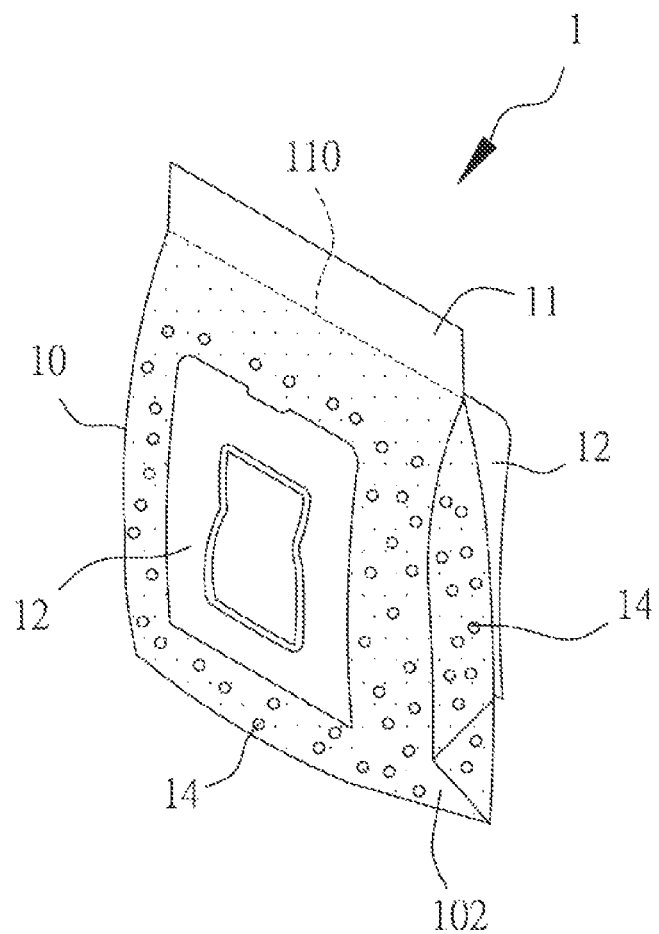
FIG. 1 is a perspective view of a planting structure in accordance with the preferred embodiment of the present invention.
Figure 2:
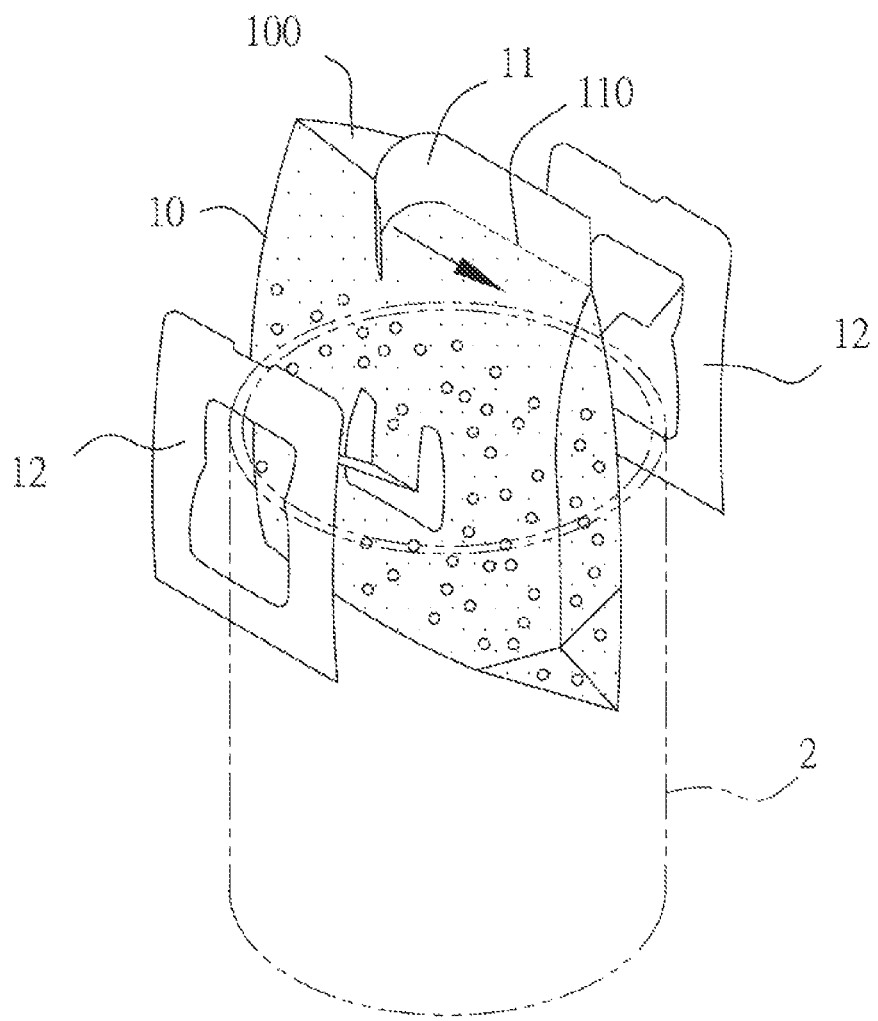
FIG. 2 is a perspective view showing the planting structure is hung on a cup.

Referring to the drawings and initially to FIGS. 1 and 2, a planting structure 1 in accordance with the preferred embodiment of the present invention comprises a water filtering (or straining) bag 10, a plurality of hanging ears 12 mounted on an outer face of the water filtering bag 10, and a plurality of planting sources (or matters or substances or seeds or staples or materials) 14 placed in the water filtering bag 10. The water filtering bag 10 is made of permeable material with a permeation (or osmosis) effect. The water filtering bag 10 has an interior provided with a receiving space 100. The planting sources 14 are received in the receiving space 100 of the water filtering bag 10.

In the preferred embodiment of the present invention, the water filtering bag 10 is made of hydrophilic cotton or recycled hydrophilic material.

In the preferred embodiment of the present invention, the water filtering bag 10 has a surface provided with a plurality of through holes 102 connected to the receiving space 100. Each of the through holes 102 of the water filtering bag 10 has a diameter smaller than that of each of the planting sources 14.

In the preferred embodiment of the present invention, the receiving space 100 of the water filtering bag 10 has an opening provided with a sealing portion 11. The sealing portion 11 of the water filtering bag 10 is formed with a breakable part (or tear line) 110 having an annular shape. The breakable part 110 of the sealing portion 11 is arranged on the surface of the water filtering bag 10.

In the preferred embodiment of the present invention, each of the hanging ears 12 is attached to the water filtering bag 10.

In the preferred embodiment of the present invention, each of the planting sources 14 is a wheatgrass.

Figure 3:
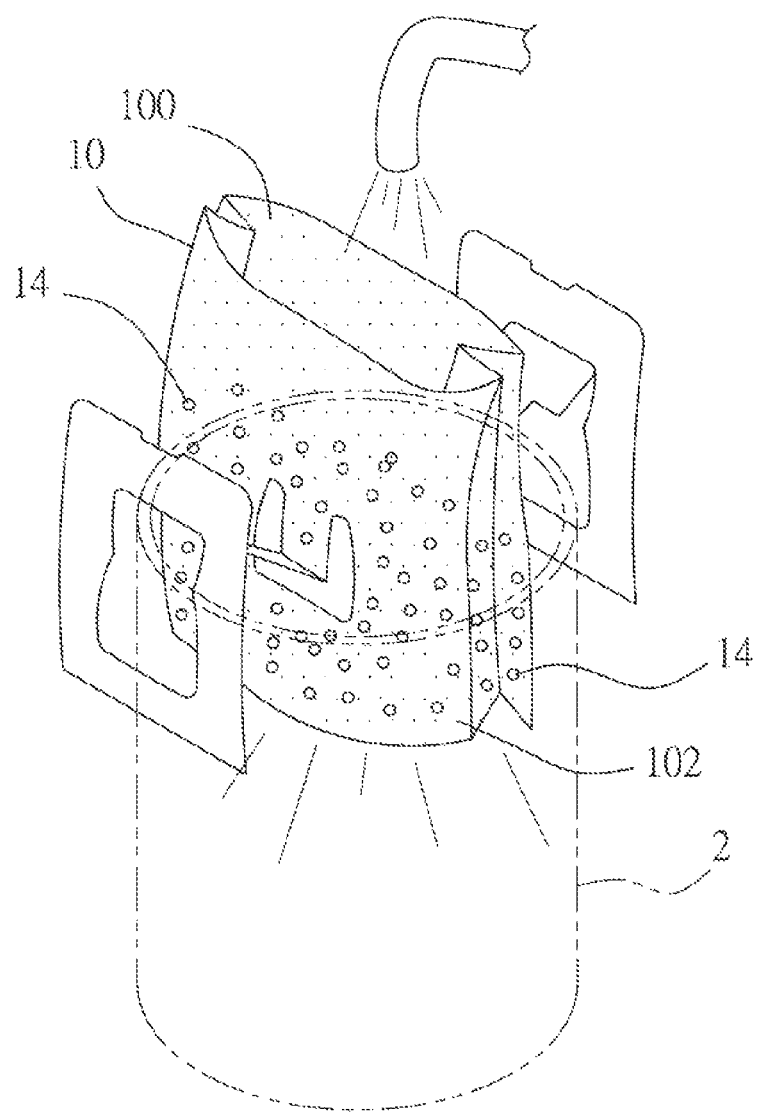
FIG. 3 is a perspective view showing the seeds of the planting structure are watered.
Figure 4:
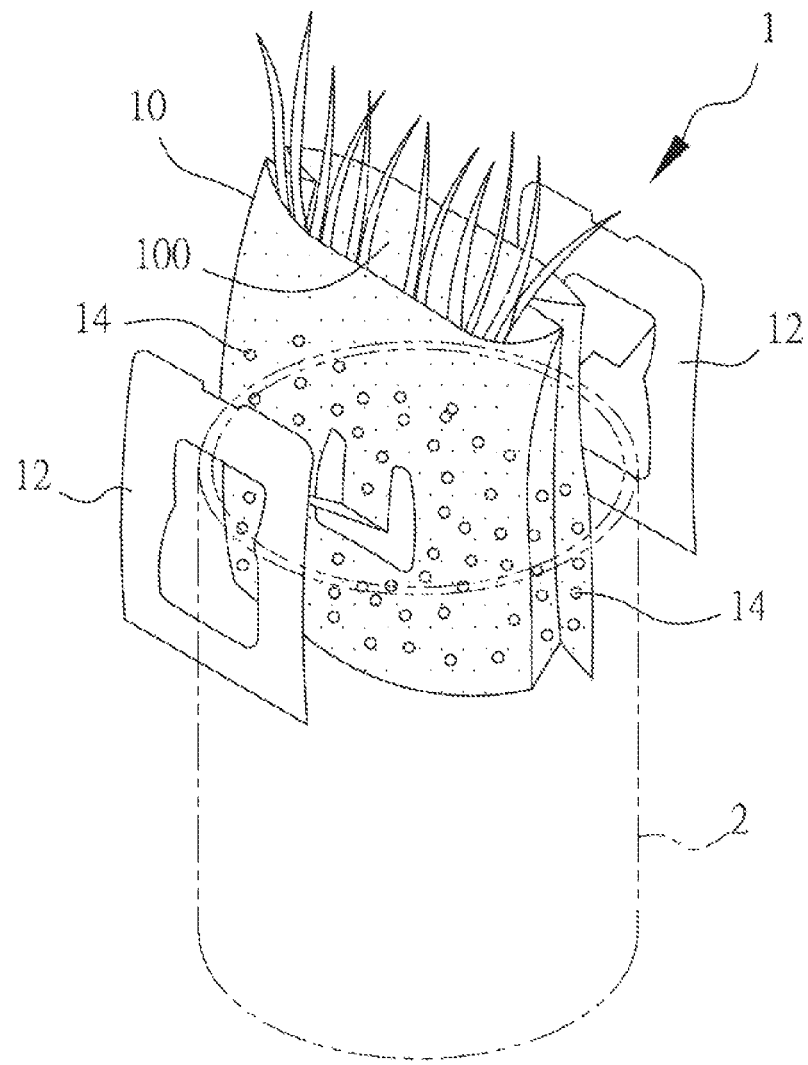
FIG. 4 is a perspective view showing the seeds of the planting structure are grown into wheatgrass.

In used, referring to FIGS. 2-4 with reference to FIG. 1, the breakable part 110 of the sealing portion 11 is torn so that the sealing portion 11 of the water filtering bag 10 is opened. Then, the hanging ears 12 are pulled outward and hung on a cup 2 so that the water filtering bag 10 is placed in the cup 2. In such a manner, the user directly pours or sprinkles water onto the planting sources 14 in the water filtering bag 10 as shown in FIG. 3, and the excessive water is drained outward from the water filtering bag 10 and dropped into the cup 2. At this time, the water filtering bag 10 is made of permeable material with a permeation effect so that the water will not be accumulated in the water filtering bag 10, to prevent the planting sources 14 from being soaked or immersed in the water. Thus, the planting sources 14 are grown into the wheatgrass gradually as shown in FIG. 4. In addition, each of the through holes 102 of the water filtering bag 10 has a diameter smaller than that of each of the planting sources 14 so that the planting sources 14 will not be dropped outward from the through holes 102 of the water filtering bag 10.

Accordingly, the planting structure 1 is directly hung on the cup 2 by the hanging ears 12, the water is directly poured onto the planting sources 14 in the water filtering bag 10, and the excessive water is drained outward from the water filtering bag 10 and received by the cup 2, so that the user plants and takes out the planting sources 14 at any time according to the practical requirement.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A planting structure comprising:
   a water filtering bag, a plurality of hanging ears mounted on an outer face of the water filtering bag, and a plurality of planting sources placed in the water filtering bag;
   wherein:
   the water filtering bag is made of permeable material with a permeation effect;
   the water filtering bag has an interior provided with a receiving space;
   the planting sources are received in the receiving space of the water filtering bag; and
   the hanging ears are directly hung on a cup, with the water filtering bag being placed in the cup.

2. The planting structure as claimed in claim 1, wherein the water filtering bag is made of hydrophilic cotton or recycled hydrophilic material.

3. The planting structure as claimed in claim 1, wherein the water filtering bag has a surface provided with a plurality of through holes, and each of the through holes of the water filtering bag has a diameter smaller than that of each of the planting sources, with the planting sources being stopped by the through holes of the water filtering bag.

4. The planting structure as claimed in claim 3, wherein:
   the receiving space of the water filtering bag has an opening provided with a sealing portion;
   the sealing portion of the water filtering bag is formed with a breakable part having an annular shape; and
   the breakable part of the sealing portion is arranged on a top of the surface of the water filtering bag.

5. The planting structure as claimed in claim 4, wherein the breakable part of the sealing portion is arranged above the hanging ears.

6. The planting structure as claimed in claim 3, wherein each of the through holes of the water filtering bag is connected to the receiving space of the water filtering bag.

7. The planting structure as claimed in claim 1, wherein each of the hanging ears is attached to the water filtering bag.

8. The planting structure as claimed in claim 1, wherein each of the planting sources is a wheatgrass.

9. The planting structure as claimed in claim 1, wherein the hanging ears are arranged symmetrically on the outer face of the water filtering bag.

10. The planting structure as claimed in claim 1, wherein the planting sources are directly placed into and stored in the receiving space of the water filtering bag.

* * * * *